(12) United States Patent
Chen et al.

(10) Patent No.: US 8,217,332 B2
(45) Date of Patent: Jul. 10, 2012

(54) OPTICAL ENGINE HAVING A BEAM SPLITTING ELEMENT COMPRISING A FIRST DICHROIC UNIT AND AN OPTICAL PATH TURNING UNIT DISPOSED IN TRANSMISSION PATHS OF A VISIBLE BEAM AND AN INVISIBLE BEAM

(75) Inventors: Sung-Nan Chen, Hsinchu (TW); Chin-Yuan Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 432 days.

(21) Appl. No.: 12/686,601

(22) Filed: Jan. 13, 2010

(65) Prior Publication Data
US 2010/0253922 A1 Oct. 7, 2010

(30) Foreign Application Priority Data

Apr. 6, 2009 (TW) .............................. 98111366 A (51) Int. Cl.
*H01J 3/14* (2006.01)

(52) U.S. Cl. ........................................ 250/216; 353/31

(58) Field of Classification Search .................. 250/216, 250/208.1, 226; 353/31–33; 349/5–8; 359/350–357
See application file for complete search history.

(56) References Cited

U.S. PATENT DOCUMENTS
7,934,836 B2 * 5/2011 Ito ................................... 353/31
* cited by examiner

*Primary Examiner* — Que T Le
(74) *Attorney, Agent, or Firm* — J.C. Patents (57) ABSTRACT

An optical engine including an illumination system, a beam splitting element, a second dichroic unit, and a light valve is provided. The illumination system provides a visible beam and an invisible beam. The beam splitting element is disposed in transmission paths of the visible and invisible beams. After the visible and invisible beams leave the beam splitting element, the optical axes of the visible and invisible beams are separated from each other. The second dichroic unit is disposed in the transmission paths of the visible and invisible beams from the beam splitting element. The visible beam passes through the second dichroic unit, and the invisible beam is reflected by the second dichroic unit. The light valve is disposed in the transmission path of the visible beam from the second dichroic unit and converts the visible beam into an image beam. The image beam passes through the second dichroic unit.

20 Claims, 8 Drawing Sheets

OPTICAL ENGINE HAVING A BEAM SPLITTING ELEMENT COMPRISING A FIRST DICHROIC UNIT AND AN OPTICAL PATH TURNING UNIT DISPOSED IN TRANSMISSION PATHS OF A VISIBLE BEAM AND AN INVISIBLE BEAM

CROSS-REFERENCE TO RELATED APPLICATION

This application claims the priority benefit of Taiwan application serial no. 98111366, filed on Apr. 6, 2009. The entirety of the above-mentioned patent application is hereby incorporated by reference herein and made a part of this specification.

BACKGROUND OF THE INVENTION

1. Field of the Invention

The invention generally relates to an optical engine, and more particularly, to an optical engine providing both a visible image beam and an invisible beam.

2. Description of Related Art

Generally speaking, a projection apparatus projects images produced by a light valve therein onto a screen. By adopting an infrared light source and an optical detector, a projection apparatus may further achieve an image detection function besides the original image projection function. Accordingly, a touch screen function may be further achieved by the projection apparatus.

To be specific, a projection apparatus with the touch screen function usually has an optical engine, a plurality of charge coupled devices (CCDs), and an infrared light emitting system. The optical engine provides an image beam, wherein the image beam is projected onto a screen located at an object side to form an image. The infrared light emitting system provides an infrared beam, wherein the infrared beam is transmitted towards the object side, and part of the infrared beam passes through the screen. Thus, when an object (for example, a finger) from the object side reaches the screen, the part of the infrared beam passing through the screen is reflected by the object to form an object beam, and the object beam is then transmitted to the CCDs. Accordingly, the CCDs may detect the image of the object.

In a conventional projection apparatus with the touch screen function, the image beam and the infrared beam do not share the same transmission path, and the transmission paths thereof are independent from each other. Accordingly, the space efficiency of the optical engine, the CCDs, and the infrared light emitting system is very low, and the volume of the projection apparatus may not be reduced. Besides, since the transmission paths of the image beam and the infrared beam are independent from each other, the positions of the optical engine, the CCDs, and the infrared light emitting system are difficult to be corrected.

In addition, the infrared beam emitted by the infrared light emitting system has to be shaped by a beam shaping element in order to irradiate every area on the screen, and even so, the infrared beam may not be uniformly projected onto the screen. As a result, the light intensity of the infrared beam within some areas on the screen may be higher than that within some other areas on the screen. Thus, a plurality of CCDs has to be disposed in the conventional projection apparatus, and these CCDs have different gains. The CCD having a greater gain is used for detecting an area having a lower light intensity on the screen, and the CCD having a smaller gain is used for detecting an area having a higher light intensity on the screen.

In other words, if only one CCD is adopted, there is only one gain. As a result, images produced on the CCDs within those areas having higher light intensities on the screen may be oversaturated while images produced on the CCDs within those areas having lower light intensities may be too dark to be identified. However, the structure of the projection apparatus may become too complicated and bulky if a plurality of CCDs are adopted.

In another conventional projection apparatus with the touch screen function, red light, green light, blue light, and infrared light are sequentially projected onto a light valve, and an image beam and an infrared beam are then transmitted to the object side through the light valve. However, because the light valve has to process the infrared light during a period time, the algorithm for controlling the light valve becomes very complicated and accordingly the cost of the projection apparatus is increased. Besides, the light valve may have enough time for processing the infrared light in order to allow the CCDs to identify the infrared beam. However, this may shorten the time for the light valve to process the visible lights, and accordingly the brightness of the image provided by the projection apparatus may be reduced. In addition, because the time for processing the infrared light is only part of the total processing time of the light valve, the identification of the CCDs to an object at the object side may not be improved.

SUMMARY OF THE INVENTION

Accordingly, the invention is directed to an optical engine, wherein both an image beam and an invisible beam provided by the optical engine have high intensities, and the transmission directions of the image beam and the invisible beam are closer to each other.

According to an embodiment of the invention, an optical engine including an illumination system, a beam splitting element, a second dichroic unit, and a light valve is provided. The illumination system is capable of providing a visible beam and an invisible beam. The beam splitting element is disposed in transmission paths of the visible beam and the invisible beam, and the beam splitting element includes a first dichroic unit and an optical path turning unit. The first dichroic unit is obliquely disposed relatively to the visible beam and the invisible beam. The optical path turning unit is obliquely disposed relatively to the visible beam and the invisible beam and kept a distance away from the first dichroic unit. One of the visible beam and the invisible beam from the illumination system is capable of being reflected by the first dichroic unit, the other one of the visible beam and the invisible beam from the illumination system is capable of passing through the first dichroic unit, being reflected by the optical path turning unit, and passing through the first dichroic unit in sequence. The optical axes of the visible beam and the invisible beam are separated from each other after the visible beam and the invisible beam leave the beam splitting element. The second dichroic unit is disposed in the transmission paths of the visible beam and the invisible beam from the beam splitting element, wherein the visible beam is capable of passing through the second dichroic unit, and the invisible beam is capable of being reflected by the second dichroic unit. The light valve is disposed in the transmission path of the visible beam from the second dichroic unit and is capable of converting the visible beam into an image beam, wherein the image beam is capable of passing through the second dichroic unit and is combined with the invisible beam reflected by the second dichroic unit.

As described above, the embodiment of the invention may have at least one of the following advantages, the optical engine has a beam splitting element for separating a visible beam and an invisible beam. Thus, the optical axes of the image beam formed by the light valve and the invisible beam reflected by the second dichroic unit may be closer to each other, and accordingly the transmission directions of the image beam and the invisible beam may also be closer to each other. Thereby, when the image beam and the invisible beam are projected onto a screen, both the image formed by the image beam on the screen and the illumination provided by the invisible beam on the screen may have uniform brightness distribution.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
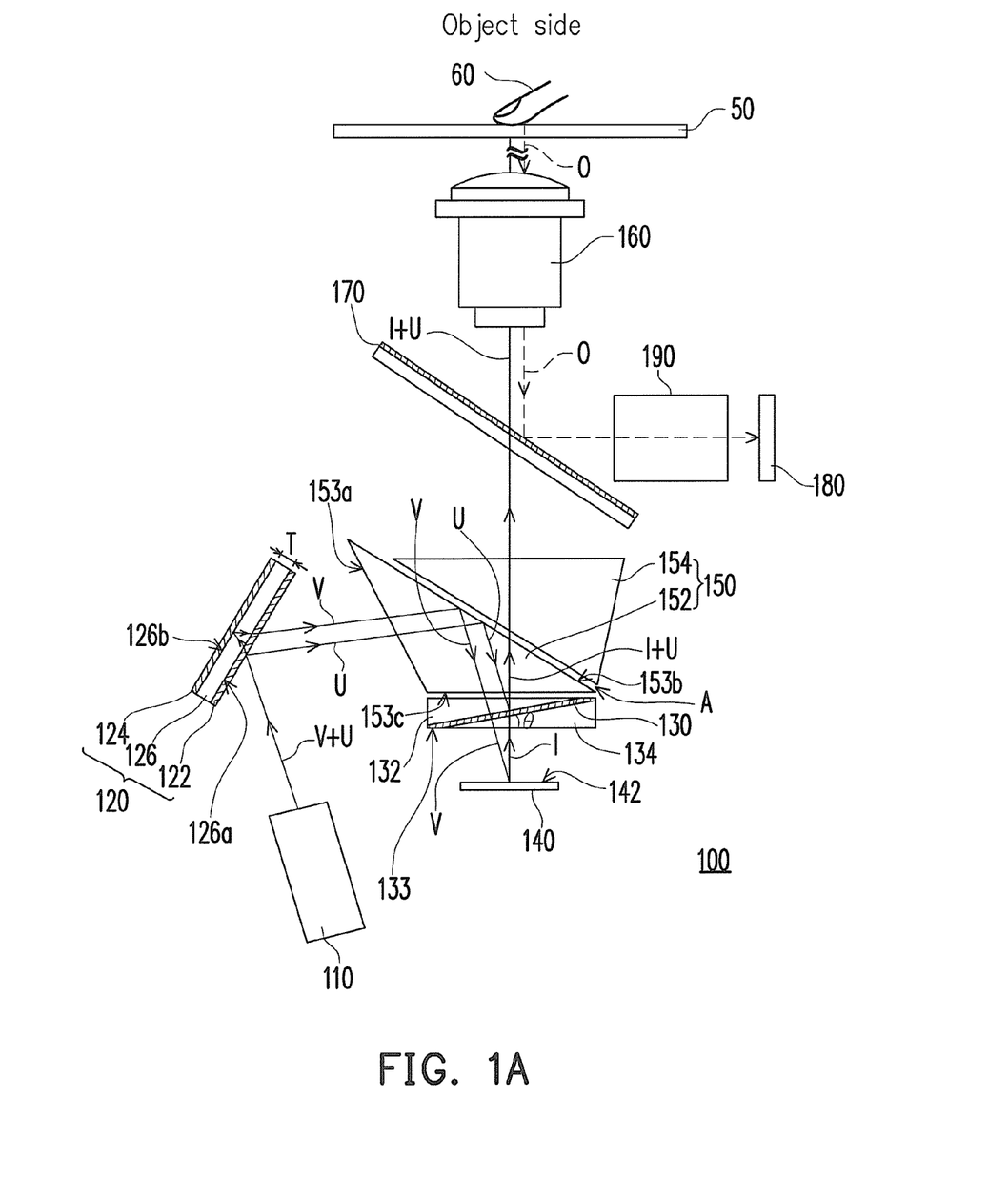
FIG. 1A is a diagram of an optical engine according to an embodiment of the invention.
Figure 1B:
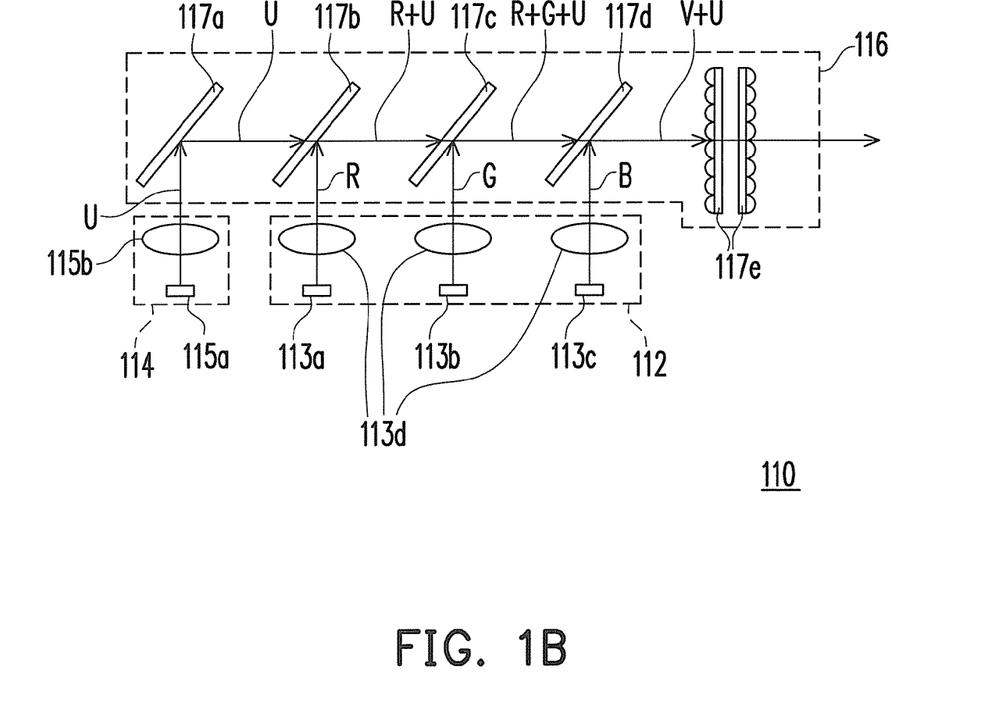
FIG. 1B is a diagram of an illumination system in FIG. 1A.

FIG. 1A is a diagram of an optical engine according to an embodiment of the invention, and FIG. 1B is a diagram of an illumination system in FIG. 1A. Referring to FIG. 1A and FIG. 1B, in the present embodiment, the optical engine 100 includes an illumination system 110, a beam splitting element 120, a second dichroic unit 130, and a light valve 140. The illumination system 110 provides a visible beam V and an invisible beam U. The beam splitting element 120 is disposed in the transmission paths of the visible beam V and the invisible beam U. In the present embodiment, the optical axis of the visible beam V substantially coincides with the optical axis of the invisible beam U between the illumination system 110 and the beam splitting element 120. The illumination system 110 includes a visible light emitting module 112, an invisible light emitting module 114, and a light combination module 116. The visible light emitting module 112 provides the visible beam V, and the invisible light emitting module 114 provides the invisible beam U. The light combination module 116 is disposed in the transmission paths of the visible beam V and the invisible beam U for combining the visible beam V and the invisible beam U.

To be specific, in the present embodiment, the visible light emitting module 112 includes a red light emitting element 113a, a green light emitting element 113b, a blue light emitting element 113c, and a plurality of lenses 113d. The red light emitting element 113a emits a red beam R, the green light emitting element 113b emits a green beam G, and the blue light emitting element 113c emits a blue beam B, wherein the red beam R, the green beam G, and the blue beam B respectively pass through the lenses 113d. In the present embodiment, the invisible light emitting module 114 includes an infrared light emitting element 115a and a lens 115b. The invisible beam U may be an infrared beam, the infrared light emitting element 115a emits the invisible beam U, and the invisible beam U passes through the lens 115b. In addition, the red light emitting element 113a, the green light emitting element 113b, the blue light emitting element 113c, and the infrared light emitting element 115a may be light emitting diodes (LEDs). However, in another embodiment of the invention, the red light emitting element 113a, the green light emitting element 113b, the blue light emitting element 113c, and the infrared light emitting element 115a may also be laser diodes or other suitable light emitting devices.

In the present embodiment, the light combination module 116 includes dichroic mirrors 117a, 117b, 117c, and 117d and a light uniforming element 117e. The dichroic mirror 117a reflects the invisible beam U, the dichroic mirror 117b combines the transmission paths of the invisible beam U and the red beam R, the dichroic mirror 117c combines the transmission paths of the invisible beam U, the red beam R, and the green beam G, and the dichroic mirror 117d combines the transmission paths of the invisible beam U, the red beam R, the green beam G, and the blue beam B. The red beam R, the green beam G, and the blue beam B form the visible beam V. In other words, the dichroic mirror 117d combines the invisible beam U and the visible beam V. The combined invisible beam U and visible beam V is uniformized by the light uniforming element 117e and then transmitted to the beam splitting element 120. In the present embodiment, the light uniforming element 117e may be a lens array. However, the light uniforming element 117e may also be a light integration rod in another embodiment of the invention.

It should be noted that in the invention, the arrangement and light combination order of the invisible beam U, the red beam R, the green beam G, and the blue beam B are not limited to those illustrated in FIG. 1B. In another embodiment of the invention, the invisible beam U, the red beam R, the green beam G, and the blue beam B may also be combined in another order and arranged in another pattern.

The beam splitting element 120 is disposed in the transmission paths of the visible beam V and the invisible beam U, and the beam splitting element 120 includes a first dichroic unit 122 and an optical path turning unit 124. The first dichroic unit 122 is obliquely disposed relatively to the visible beam V and the invisible beam U. The optical path turning unit 124 is obliquely disposed relatively to the visible beam V and the invisible beam U and kept a distance T away from the first dichroic unit 122. In the present embodiment, a light-transmissive substrate 126 is disposed between the first dichroic unit 122 and the optical path turning unit 124 for keeping the distance T between the first dichroic unit 122 and the optical path turning unit 124. The light-transmissive substrate 126 has a first surface 126a and a second surface 126b opposite to the first surface 126a, the first dichroic unit 122 and the optical path turning unit 124 are respectively disposed on the first surface 126a and the second surface 126b.

One of the visible beam V and the invisible beam U from the illumination system 110 is reflected by the first dichroic unit 122, the other one of the visible beam V and the invisible beam U from the illumination system 110 passes through the first dichroic unit 122, is reflected by the optical path turning unit 124, and passes through the first dichroic unit 122 again in sequence. In the present embodiment, the invisible beam U is reflected by the first dichroic unit 122, and the visible beam V passes through the first dichroic unit 122, is reflected by the optical path turning unit 124, and passes through the first dichroic unit 122 again in sequence. However, in another embodiment of the invention, it may also be the visible beam V which is reflected by the first dichroic unit 122 and the invisible beam U which passes through the first dichroic unit 122, is reflected by the optical path turning unit 124, and finally passes through the first dichroic unit 122 again in sequence.

In the present embodiment, the first dichroic unit 122 may be a dichroic film which reflects the invisible beam U and lets the visible beam V to pass through. Besides, the optical path turning unit 124 may be a dichroic film for reflecting the visible beam V. However, the optical path turning unit 124 may also be a reflective film in another embodiment of the invention.

Because the first dichroic unit 122 and the optical path turning unit 124 are obliquely disposed relatively to the visible beam V and the invisible beam U, and a distance T is kept between the first dichroic unit 122 and the optical path turning unit 124, the optical axes of the visible beam V and the invisible beam U are separated from each other after the visible beam V and the invisible beam U leave the beam splitting element 120. In the present embodiment, the first dichroic unit 122 and the optical path turning unit 124 are substantially parallel to each other so that the optical axes of the visible beam V and the invisible beam U may be substantially parallel to but not coincide with each other.

The second dichroic unit 130 is disposed in the transmission paths of the visible beam V and the invisible beam U from the beam splitting element 120, wherein the visible beam V passes through the second dichroic unit 130, and the invisible beam U is reflected by the second dichroic unit 130. The light valve 140 is disposed in the transmission path of the visible beam V from the second dichroic unit 130 and converts the visible beam V into an image beam I, wherein the image beam I passes through the second dichroic unit 130 and is combined with the invisible beam U reflected by the second dichroic unit 130. Because the optical axes of the visible beam V and the invisible beam U from the beam splitting element 120 are separated from each other, the optical axis of the image beam I passing through the second dichroic unit 130 may be closer to the optical axis of the invisible beam U reflected by the second dichroic unit 130. In the present embodiment, because the optical axes of the visible beam V and the invisible beam U from the beam splitting element 120 are substantially parallel to but not coincide with each other, the optical axis of the image beam I passing through the second dichroic unit 130 may be made substantially coinciding with the optical axis of the invisible beam U reflected by the second dichroic unit 130 by appropriately controlling the distance between the second dichroic unit 130 and the light valve 140 and the inclination angle θ of the second dichroic unit 130 relatively to an active surface 142 of the light valve 140. In the present embodiment, the inclination angle θ is smaller than or equal to 10°. Besides, the light valve 140 may be a digital micro-mirror device (DMD), and the active surface 142 is the surface of the light valve 140 for processing light. However, in another embodiment of the invention, the light valve 140 may also be a liquid-crystal-on-silicon (LCOS) panel.

The optical engine 100 further includes a total internal reflection prism 150, wherein the total internal reflection prism 150 has a first prism 152 and a second prism 154. The first prism 152 has a light incident surface 153a and a total internal reflection surface 153b, wherein the visible beam V and the invisible beam U from the beam splitting element 120 sequentially enter the first prism 152 through the light incident surface 153a and are totally internally reflected by the total internal reflection surface 153b to the second dichroic unit 130. To be specific, the visible beam V and the invisible beam U totally internally reflected by the total internal reflection surface 153b are transmitted to the second dichroic unit 130 through the surface 153c of the first prism 152. The second prism 154 is disposed at one side of the total internal reflection surface 153b and kept a distance A away from the total internal reflection surface 153b, wherein the image beam I passing through the second dichroic unit 130 and the invisible beam U reflected by the second dichroic unit 130 sequentially pass through the total internal reflection surface 153b and the second prism 154. The second prism 154 may compensate the optical path so that the image beam I and the invisible beam U may be made more uniform.

In the present embodiment, the optical engine 100 further includes a third prism 132 and a fourth prism 134. The third prism 132 is adjacent to the first prism 152 and located between the first prism 152 and the second dichroic unit 130. The fourth prism 134 is adjacent to the third prism 132, wherein the second dichroic unit 130 is a dichroic film, and the second dichroic unit 130 is located at a junction 133 between the third prism 132 and the fourth prism 134. In the present embodiment, the second dichroic unit 130 may be a dichroic film which may reflect infrared light and let visible light to pass through. Besides, in the present embodiment, the second dichroic unit 130 may cover the junction 133 entirely.

It should be noted that in the invention, the dispositions and designs of the total internal reflection prism 150, the second dichroic unit 130, and other prisms are not limited to those illustrated in FIG. 1A. Below, other possible disposition and design patterns of the total internal reflection prism 150, the second dichroic unit 130, and the other prisms will be described below.

Figure 2A:
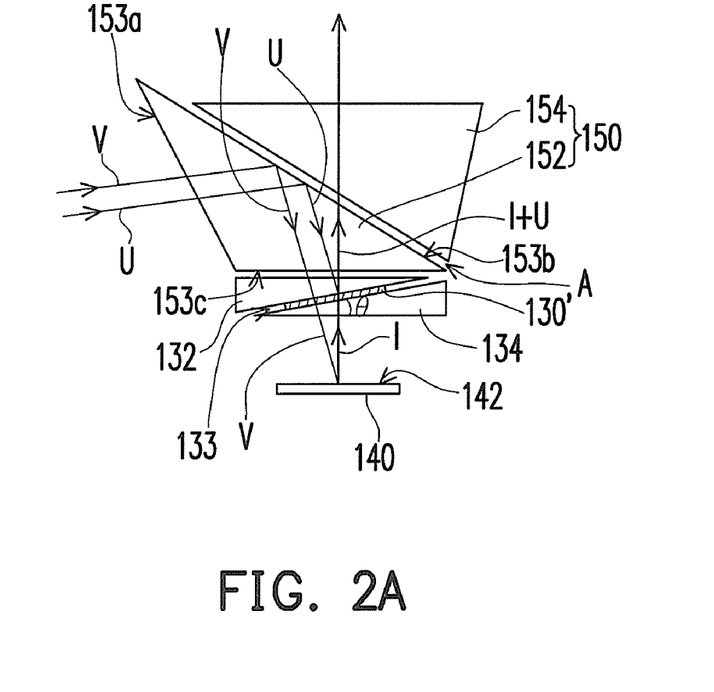
FIG. 2A is a diagram of a total internal reflection prism, a second dichroic unit, and other prisms according to another embodiment of the invention.
Figure 2B:
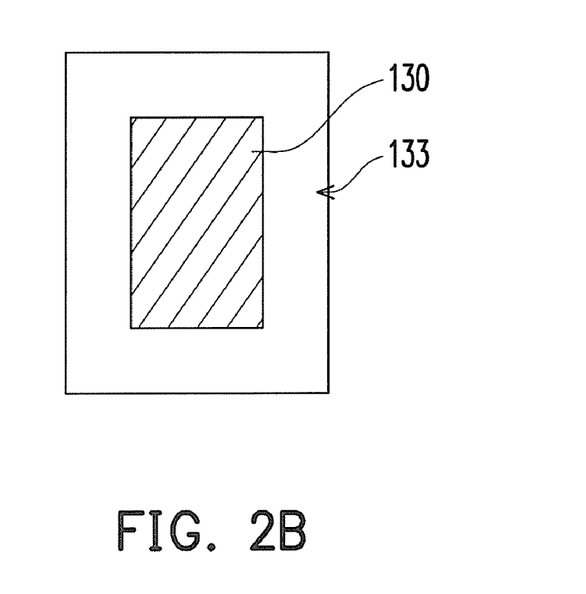
FIG. 2B is a front view of a junction and the second dichroic unit in FIG. 2A.

Referring to FIG. 2A and FIG. 2B, in the present embodiment, the second dichroic unit 130' is located at the center part of the junction 133, and the front view of the junction 133 and the second dichroic unit 130' is illustrated in FIG. 2B. Since the second dichroic unit 130' may reflect the invisible beam U as long as it covers the irradiation range of the invisible beam U, the second dichroic unit 130' does not have to cover the junction 133 entirely.

Figure 3:
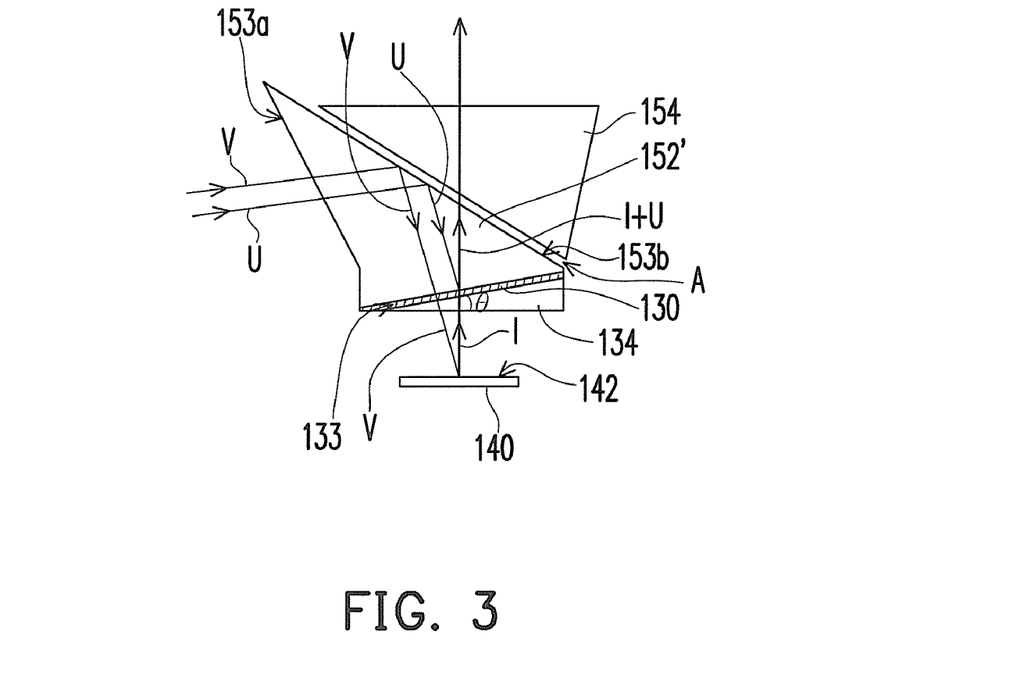
FIG. 3 and FIG. 4 are respectively diagrams of a total internal reflection prism, a second dichroic unit, and other prisms according to another two embodiments of the invention.

Referring to FIG. 3, in the present embodiment, the first prism 152 and the third prism 132 in FIG. 1A are combined into a first prism 152', the fourth prism 134 leans against the first prism 152', and the second dichroic unit 130 is located at the junction 133 between the first prism 152' and the fourth prism 134.

Figure 4:
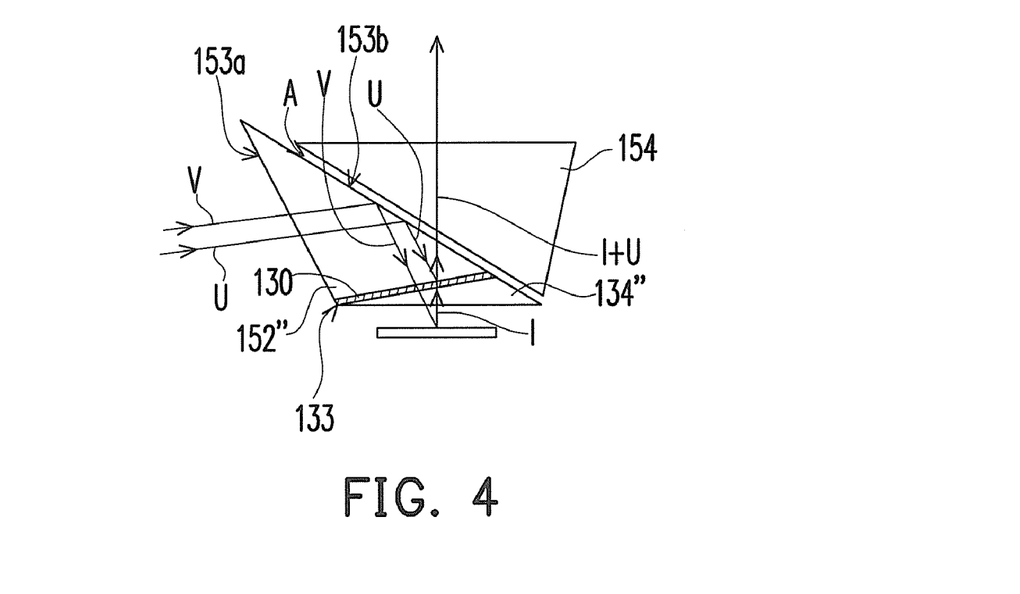

Referring to FIG. 4, in the present embodiment, the first prism 152 in FIG. 1A is divided into a first prism 152" and a fourth prism 134", the fourth prism 134" leans against the first prism 152", and the second dichroic unit 130 is located at the junction 133 between the first prism 152" and the fourth prism 134".

It should be noted that in the embodiments illustrated in FIG. 3 and FIG. 4, the second dichroic unit 130 covers the junction 133 entirely. However, in another embodiment of the invention, the second dichroic unit 130 may also be located at the center part of the junction 133.

Referring to FIG. 1A, in the present embodiment, the optical engine 100 further includes a projection lens 160 disposed in the transmission paths of the image beam I passing through the second dichroic unit 130 and the invisible beam U reflected by the second dichroic unit 130. In the present embodiment, the optical engine 100 further includes an invisible beam splitter 170 and an optical detector 180. The invisible beam splitter 170 is disposed in the transmission paths of the image beam I passing through the second dichroic unit 130 and the invisible beam U reflected by the second dichroic unit 130, wherein the image beam I passes through the invisible beam splitter 170 to reach the projection lens 160, a part of the invisible beam U passes through the invisible beam splitter 170 to reach the projection lens 160, and another part of the invisible beam U is reflected by the invisible beam splitter 170. To be specific, the invisible beam splitter 170 may be an infrared light transflective mirror which allows visible light and about 50% of infrared light to pass through and reflects another 50% of the infrared light.

The image beam I and the part of the invisible beam U are projected by the projection lens 160 to an object side, for example, onto a screen 50 at the object side. Accordingly, the optical engine 100 fauns an image on the screen 50. Thus, the optical engine 100 may be considered as a projection apparatus. An object 60 located at the object side reflects part of the invisible beam U into an object beam O. The object beam O passes through the projection lens 160 and reaches the invisible beam splitter 170, and the invisible beam splitter 170 reflects part of the object beam O to the optical detector 180. In the present embodiment, the optical engine 100 further includes an imaging lens 190 disposed in the transmission path of the part of the object beam O and between the invisible beam splitter 170 and the optical detector 180.

In the present embodiment, the object 60 may be a finger of a user, and the invisible light reflected by the user's finger forms an image of the user's finger on the optical detector 180. The optical detector 180 may be a charge coupled device (CCD) or a complementary metal oxide semiconductor (CMOS) sensor and which may be electrically connected to a processor, such as a computer processor. After the processor reads the image of the finger, it generates a control signal for controlling the computer, so that the user may operate the computer by moving or clicking his finger on the screen, and accordingly the optical engine 100 may be considered as a projection apparatus with a touch screen function.

Figure 5:
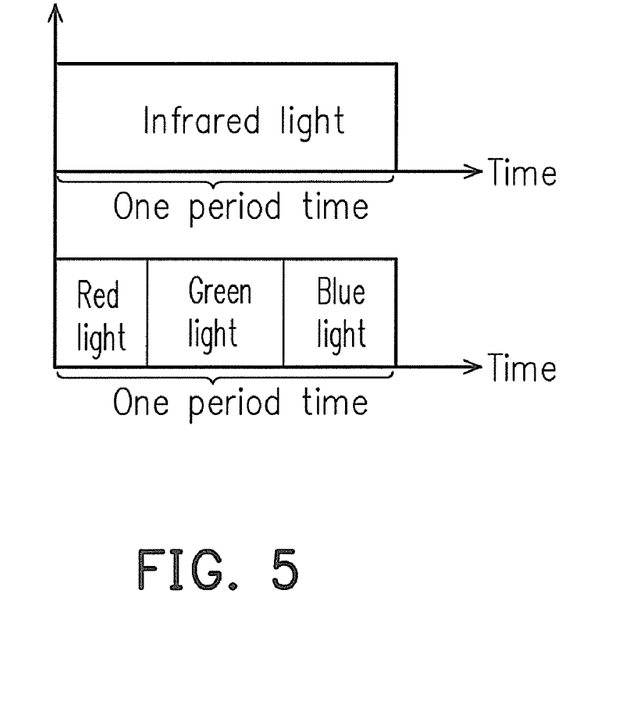
FIG. 5 is a timing distribution diagram of light beams of different colors provided by the illumination system in FIG. 1B.

FIG. 5 is a timing distribution diagram of light beams of different colors produced by the illumination system in FIG. 1B. Referring to FIG. 1A, FIG. 1B, and FIG. 5, in the optical engine 100 of the present embodiment, because the visible beam V is reflected by the light valve 140 to generate the image beam I transmitted to the object side, and the invisible beam U is reflected by the second dichroic unit 130 to be transmitted to the object side (i.e., the invisible beam U is not transmitted to the light valve 140), the visible beam V and the invisible beam U may be emitted during a same period time, wherein the red beam R, the green beam G, and the blue beam B for forming the visible beam V may be sequentially emitted and then stopped. In the conventional optical engine wherein the visible beam and the invisible beam are both reflected by the light valve, because the visible beam and the invisible beam have to be alternatively emitted and stopped, the visible beam and the invisible beam are only emitted for part of a period time. In the optical engine 100 of the present embodiment, because the visible beam V and the invisible beam U may be simultaneously emitted during any period time, the visible beam V and the invisible beam U may have higher average light intensities. Accordingly, the optical engine 100 may generate brighter images, and since the average light intensity of the invisible beam U is higher, the identification of the optical detector 180 in the optical engine 100 is improved. Moreover, as shown in FIG. 1A, FIG. 1B, and FIG. 5, the invisible beam U, the visible beam V, and the light valve 140 are separately controlled so that a simple algorithm may be adopted by the optical engine 100 for controlling the visible light emitting module 112, the invisible light emitting module 114, and the light valve 140. Accordingly, the cost of the optical engine 100 may be reduced.

In addition, the optical engine 100 in the present embodiment has the beam splitting element 120 for separating the visible beam V and the invisible beam U, such that the optical axis of the image beam I generated by the light valve 140 and the optical axis of the invisible beam U reflected by the second dichroic unit 130 may be closer to or even coincide with each other, and accordingly the transmission directions of the image beam I and the invisible beam U may be closer to each other. Thus, when the image beam I and the invisible beam U are projected by the projection lens 160 onto the screen 50, both the image formed by the image beam I on the screen 50 and the illumination provided by the invisible beam U on the screen 50 may have uniform brightness distribution. Besides, because the transmission directions of the image beam I and the invisible beam U are closer to each other, the incident angles of the image beam I and the invisible beam U relatively to the screen are closer to each other, so that both the image beam I and the invisible beam U may have high transmittances with appropriate screen dispositions. Accordingly, besides the brightness of the image being increased, more invisible beam U is irradiated on the object 60, and accordingly the identification of the optical detector 180 is improved. In addition, since the object beam O reflected by the object 60 is also transmitted to the optical detector 180 through the projection lens 160, the optical detector 180 may uniformly receive the invisible light from the screen 50. Thus, in the present embodiment, the object 60 at the object side may be effectively identified by adopting a single optical detector 180 and using only one gain at the same time.

Figure 6:
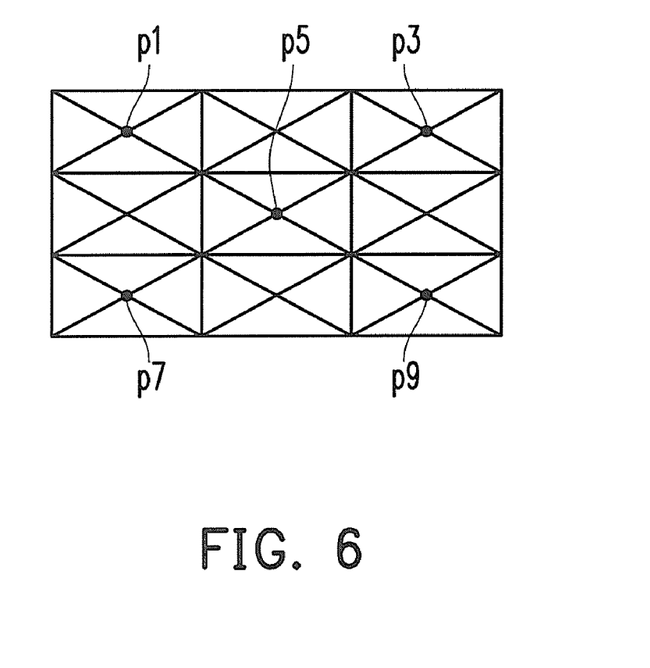
FIG. 6 is a diagram illustrating the position of a screen in FIG. 1A.

FIG. 6 is a diagram illustrating the position of the screen in FIG. 1A. Referring to FIG. 1A and FIG. 6, if the screen is divided into 9 areas, the center points of the four areas located at the four corners are respectively point p1, point p3, point p7, and point p9, and by assuming the center point of the central area to be a point p5, the illumination uniformity UNI of the invisible beam U on the screen may be defined as:

$$UNI=(I_{p1}+I_{p3}+I_{p7}+I_{p9})/I_{p5}$$

In foregoing expression, $I_{p1}$, $I_{p3}$, $I_{p5}$, $I_{p7}$, and $I_{p9}$ are respectively the illuminations at the points p1, p3, p5, p7, and p9. It may be understood through optical simulation that the illumination uniformity UNI in the present embodiment may be up to 86% and accordingly the optical engine 100 in the present embodiment does provide a uniform invisible light illumination.

Figure 7:
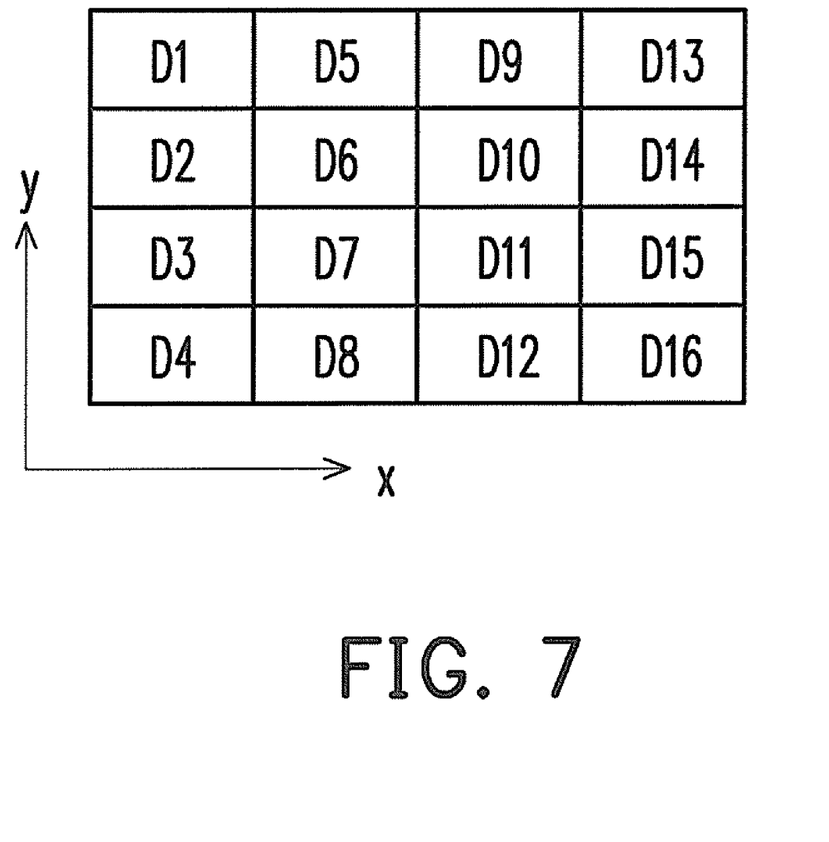
FIG. 7 illustrates areas on the screen in FIG. 1A.

FIG. 7 illustrates the areas on the screen in FIG. 1A. Referring to FIG. 7, if the screen is divided into 16 equal parts (i.e., areas D1~D16), by optically simulating the optical engine 100 in the present embodiment, the absolute average incident angle difference between the image beam I and the invisible beam U in direction x and direction y within the areas D1~D16 are listed in the following table:

| Area | Absolute average incident angle difference between the image beam and the invisible beam in direction x | Absolute average incident angle difference between the image beam and the invisible beam in direction y |
| --- | --- | --- |
| D1 | 0.6 | 0.9 |
| D2 | 1.4 | 3.6 |
| D3 | 0.3 | 3.2 |
| D4 | 1 | 0.4 |
| D5 | 0.9 | 1.62 |
| D6 | 0.03 | 0.8 |
| D7 | 0.2 | 0.8 |
| D8 | 0.02 | 0.3 |
| D9 | 0.5 | 0.6 |
| D10 | 0.4 | 0.2 |
| D11 | 0.2 | 0.9 |
| D12 | 0.13 | 0.3 |
| D13 | 0.5 | 0.8 |
| D14 | 0.4 | 0.8 |
| D15 | 0.21 | 0.7 |
| D16 | 0.15 | 0.4 |

For example, the value 0.8 in the third field of the row D14 represents that the absolute average incident angle difference between the image beam I and the invisible beam U in the direct y within the area D14 is 0.8°, and the meanings of the other values in foregoing table may be understood accordingly. As shown in the table, the maximum value of the absolute average incident angle difference between the image beam I and the invisible beam U on the screen 50 is 3.6. Accordingly, it reflects that the incident angles of the image beam I and the invisible beam U provided by the optical engine 100 in the present embodiment on the screen 50 are very close, so that the transmittances of the image beam I and the invisible beam U regarding the screen 50 are both improved.

Figure 8:
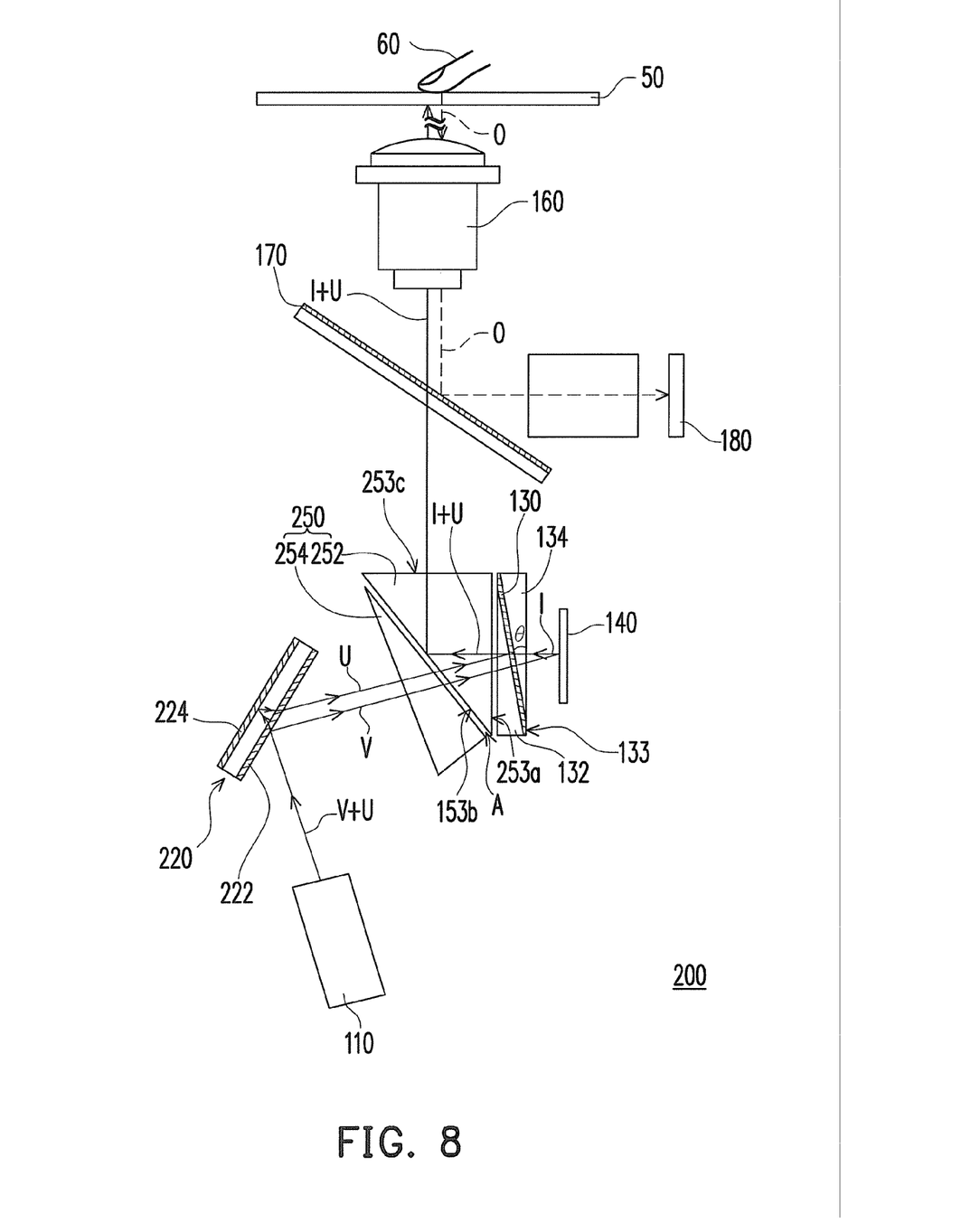
FIG. 8 is a diagram of an optical engine according to another embodiment of the invention.

FIG. 8 is a diagram of an optical engine according to another embodiment of the invention. Referring to FIG. 8, the optical engine 200 in the embodiment is similar to the optical engine 100 (as shown in FIG. 1A) described above, and the difference between the two will be described herein. In the optical engine 200, the visible beam V is reflected by the first dichroic unit 222 of the beam splitting element 220 to the second dichroic unit 130, and the invisible beam U passes through the first dichroic unit 222, is reflected by the optical path turning unit 224, and passes through the first dichroic unit 222 again to be transmitted to the second dichroic unit 130 in sequence. Besides, in the present embodiment, the first prism 252 of the total internal reflection prism 250 has a total internal reflection surface 153b and a light emitting surface 253c. The visible beam V and the invisible beam U from the beam splitting element 220 sequentially enter the first prism 252 through the total internal reflection surface 153b and reach the second dichroic unit 130, and the image beam I passing through the second dichroic unit 130 and the invisible beam U reflected by the second dichroic unit 130 are sequentially totally internally reflected by the total internal reflection surface 153b and leave the first prism 252 through the light emitting surface 253c to be transmitted to the projection lens 160.

The second prism 254 is disposed at one side of the total internal reflection surface 153b and kept a distance A away from the total internal reflection surface 153b, wherein the visible beam V and the invisible beam U from the beam splitting element 220 pass through the second prism 254 to reach the total internal reflection surface 153b. Besides, in the present embodiment, the third prism 132 is located between the surface 253a of the first prism 252 and the second dichroic unit 130, the fourth prism 134 leans against the third prism 132, and the second dichroic unit 130 is located at a junction 133 between the third prism 132 and the fourth prism 134.

The optical engine 200 in the present embodiment also has the advantages and functions of the optical engine 100 (as shown in FIG. 1A) described above and will not be described herein. Below, other possible disposition and design patterns of the total internal reflection prism 250, the second dichroic unit 130, and the other prisms will be described.

Figure 9:
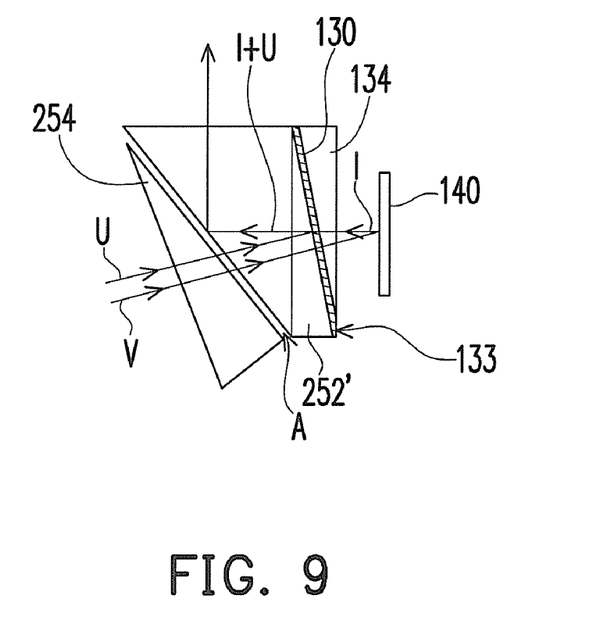
FIG. 9 and FIG. 10 are respectively diagrams of a total internal reflection prism, a second dichroic unit, and other prisms according to another two embodiments of the invention.

Referring to FIG. 9, in the present embodiment, the first prism 252 and the third prism 132 in FIG. 8 are combined into a first prism 252', the fourth prism 134 leans against the first prism 252', and the second dichroic unit 130 is located at the junction 133 between the first prism 252' and the fourth prism 134.

Figure 10:
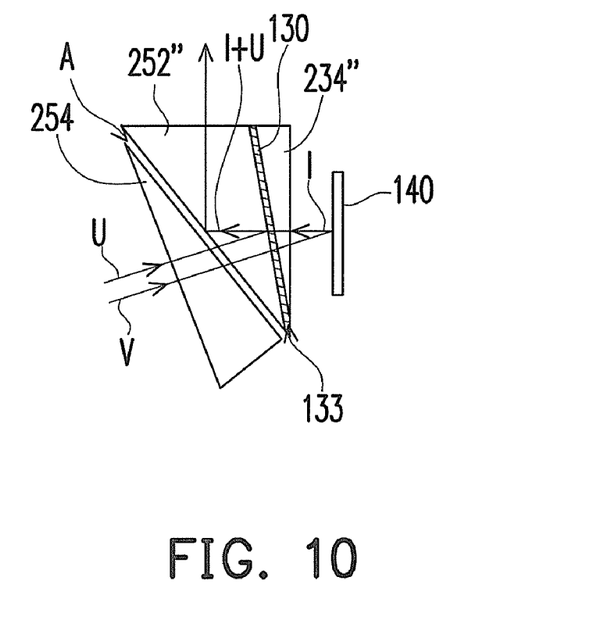

Referring to FIG. 10, in the present embodiment, the first prism 252 in FIG. 8 is divided into a first prism 252" and a fourth prism 234", the fourth prism 234" leans against the first prism 252", and the second dichroic unit 130 is located at the junction 133 between the first prism 252" and the fourth prism 234".

It should be noted that in the embodiments of the invention described above, the third prism and the fourth prism are all cemented together, and the first prism and the fourth prism are also cemented together. However, in another embodiment of the invention, an air gap may be kept between the third prism and the fourth prism, and the second dichroic unit may be located on a surface of the third prism or the fourth prism. Similarly, an air gap may be kept between the first prism and the fourth prism, and the second dichroic unit may be located on a surface of the first prism or the fourth prism. In addition, in the embodiments described above, an air gap is kept between the third prism and the first prism. However, in another embodiment of the invention, the third prism and the first prism may also be cemented together.

As described above, the embodiment or the embodiments of the invention may have at least one of the following advantages, in an optical engine according to the embodiments of the invention, a visible beam is reflected by a light valve to generate an image beam which is transmitted to an object side, and an invisible beam is reflected by a second dichroic unit and then transmitted to the object side. In other words, the invisible beam is not transmitted to the light valve. Accordingly, the visible beam and the invisible beam may be simultaneously emitted during a period time. Since the visible beam and the invisible beam of the optical engine may always be simultaneously emitted during any period time, both the visible beam and the invisible beam may have high average light intensities. Accordingly, the optical engine in the embodiment of the invention may generate images of high brightness, and because the average light intensity of the invisible beam is increased, the identification of an optical detector in the optical engine is improved. Moreover, because the invisible beam, the visible beam, and the light valve are separately controlled, a simple algorithm may be adopted by the optical engine for controlling the visible light emitting module, the invisible light emitting module, and the light valve, and accordingly the cost of the optical engine may be reduced.

Besides, because the optical engine according to the embodiments of the invention has a beam splitting element for separating the visible beam and the invisible beam, the optical axis of the image beam produced by the light valve and the optical axis of the invisible beam reflected by the second dichroic unit may be closer to or even coincide with each other, so that the transmission directions of the image beam and the invisible beam may also be closer to each other. Thus, when the image beam and the invisible beam are projected by a projection lens onto a screen, both the image formed by the image beam on the screen and the illumination provided by the invisible beam on the screen may have uniform brightness distribution. Furthermore, since the transmission directions of the image beam and the invisible beam are closer to each other, the incident angles of the image beam and the invisible beam relatively to the screen are also closer to each other. Thus, the transmittances of both the image beam and the invisible beam may be improved with appropriate screen dispositions. Thereby, in the embodiments of the invention, the image brightness is improved, and since more invisible beams are irradiated on the object, the identification of the optical detector is also improved.

The forgoing description of the preferred embodiments of the invention has been presented for purposes of illustration and description. It is not intended to be exhaustive or to limit the invention to the precise fowl or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical engine, comprising:
   an illumination system, for providing a visible beam and an invisible beam;
   a beam splitting element, disposed in transmission paths of the visible beam and the invisible beam, the beam splitting element comprising:
      a first dichroic unit, obliquely disposed relatively to the visible beam and the invisible beam; and
      an optical path turning unit, obliquely disposed relatively to the visible beam and the invisible beam, and kept a distance away from the first dichroic unit, wherein one of the visible beam and the invisible beam from the illumination system is capable of being reflected by the first dichroic unit, the other one of the visible beam and the invisible beam from the illumination system is capable of passing through the first dichroic unit, being reflected by the optical path turning unit, and passing through the first dichroic unit in sequence, and an optical axis of the visible beam and an optical axis of the invisible beam are separated from each other after the visible beam and the invisible beam leave the beam splitting element;
   a second dichroic unit, disposed in the transmission paths of the visible beam and the invisible beam from the beam splitting element, wherein the visible beam is capable of passing through the second dichroic unit, and the invisible beam is capable of being reflected by the second dichroic unit; and
   a light valve, disposed in the transmission path of the visible beam from the second dichroic unit, for converting the visible beam into an image beam, wherein the image beam is capable of passing through the second dichroic unit and is combined with the invisible beam reflected by the second dichroic unit.

2. The optical engine according to claim 1, wherein the optical axis of the visible beam substantially coincides with the optical axis of the invisible beam between the illumination system and the beam splitting element.

3. The optical engine according to claim 1, wherein the first dichroic unit and the optical path turning unit are substantially parallel to each other.

4. The optical engine according to claim 1, wherein the beam splitting element further comprises a light-transmissive substrate having a first surface and a second surface opposite to the first surface, the first dichroic unit and the optical path turning unit are respectively disposed on the first surface and the second surface, the first dichroic unit is a dichroic film, and the optical path turning unit is a dichroic film or a reflective film.

5. The optical engine according to claim 1, wherein the optical axis of the image beam passing through the second dichroic unit substantially coincides with the optical axis of the invisible beam reflected by the second dichroic unit.

6. The optical engine according to claim 1 further comprising a total internal reflection prism, wherein the total internal reflection prism comprises:
 a first prism, having a light incident surface and a total internal reflection surface, wherein the visible beam and the invisible beam from the beam splitting element are capable of entering the first prism through the light incident surface and are capable of being totally internally reflected by the total internal reflection surface to the second dichroic unit; and
 a second prism, disposed at one side of the total internal reflection surface, and kept a distance away from the total internal reflection surface, wherein the image beam passing through the second dichroic unit and the invisible beam reflected by the second dichroic unit are capable of passing through the total internal reflection surface and the second prism.

7. The optical engine according to claim 6 further comprising:
 a third prism, adjacent to the first prism, and located between the first prism and the second dichroic unit; and
 a fourth prism, adjacent to the third prism, wherein the second dichroic unit is a dichroic film, and the second dichroic unit is located at a junction between the third prism and the fourth prism.

8. The optical engine according to claim 7, wherein the second dichroic unit is located at a center part of the junction or covers the junction entirely.

9. The optical engine according to claim 6 further comprising a fourth prism adjacent to the first prism, wherein the second dichroic unit is a dichroic film, and the second dichroic unit is located at a junction between the first prism and the fourth prism.

10. The optical engine according to claim 9, wherein the second dichroic unit is located at a center part of the junction or covers the junction entirely.

11. The optical engine according to claim 1 further comprising a total internal reflection prism, wherein the total internal reflection prism comprises:
 a first prism, having a total internal reflection surface and a light emitting surface, wherein the visible beam and the invisible beam from the beam splitting element are capable of entering the first prism through the total internal reflection surface and reaching the second dichroic unit, and the image beam passing through the second dichroic unit and the invisible beam reflected by the second dichroic unit are capable of being totally internally reflected by the total internal reflection surface and leaving the first prism through the light emitting surface; and
 a second prism, disposed at one side of the total internal reflection surface, and kept a distance away from the total internal reflection surface, wherein the visible beam and the invisible beam from the beam splitting element are capable of passing through the second prism and reaching the total internal reflection surface.

12. The optical engine according to claim 11 further comprising:
 a third prism, adjacent to the first prism, and located between the first prism and the second dichroic unit; and
 a fourth prism, adjacent to the third prism, wherein the second dichroic unit is a dichroic film, and the second dichroic unit is located at a junction between the third prism and the fourth prism.

13. The optical engine according to claim 12, wherein the second dichroic unit is located at a center part of the junction or covers the junction entirely.

14. The optical engine according to claim 11 further comprising a fourth prism adjacent to the first prism, wherein the second dichroic unit is a dichroic film, and the second dichroic unit is located at a junction between the first prism and the fourth prism.

15. The optical engine according to claim 14, wherein the second dichroic unit is located at a center part of the junction or covers the junction entirely.

16. The optical engine according to claim 1, wherein the second dichroic unit is tilted an inclination angle relatively to an active surface of the light valve, and the inclination angle is smaller than or equal to 10°.

17. The optical engine according to claim 1 further comprising a projection lens disposed in the transmission paths of the image beam passing through the second dichroic unit and the invisible beam reflected by the second dichroic unit.

18. The optical engine according to claim 17 further comprising:
 an invisible beam splitter, disposed in the transmission paths of the image beam passing through the second dichroic unit and the invisible beam reflected by the second dichroic unit, wherein the image beam is capable of passing through the invisible beam splitter and reaching the projection lens, a part of the invisible beam is capable of passing through the invisible beam splitter and reaching the projection lens, and another part of the invisible beam is capable of being reflected by the invisible beam splitter; and
 an optical detector, wherein the projection lens is capable of projecting the image beam and the part of the invisible beam to an object side, an object located at the object side is capable of reflecting the part of the invisible beam into an object beam, the object beam is capable of passing through the projection lens and reaching the invisible beam splitter, and the invisible beam splitter is capable of reflecting a part of the object beam to the optical detector.

19. The optical engine according to claim 18 further comprising an imaging lens disposed in a transmission path of the part of the object beam and located between the invisible beam splitter and the optical detector.

20. The optical engine according to claim 1, wherein the illumination system comprises:
 a visible light emitting module, for providing the visible beam;
 an invisible light emitting module, for providing the invisible beam; and
 a light combination module, disposed in the transmission paths of the visible beam and the invisible beam, for combining the visible beam and the invisible beam.

* * * * *